(12) United States Patent
Park et al.

(10) Patent No.: US 12,368,364 B2
(45) Date of Patent: Jul. 22, 2025

(54) POLARITY SWITCHING POWER SUPPLY DEVICE

(71) Applicant: Microsoft Technology Licensing, LLC, Redmond, WA (US)

(72) Inventors: Chang Joon Park, Sunnyvale, CA (US); Mike Voong, Daly City, CA (US); Brock McCray Roland, San Bruno, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 18/064,870

(22) Filed: Dec. 12, 2022

(65) Prior Publication Data

US 2024/0195280 A1  Jun. 13, 2024

(51) Int. Cl.

| | |
|---|---|
| H04N 23/55 | (2023.01) |
| G02B 27/01 | (2006.01) |
| G09G 3/36 | (2006.01) |
| H02M 1/00 | (2006.01) |
| H02M 1/08 | (2006.01) |
| H02M 3/158 | (2006.01) |
| H02M 3/157 | (2006.01) |

(52) U.S. Cl.
CPC ...... *H02M 1/0003* (2021.05); *G02B 27/0172* (2013.01); *G09G 3/3614* (2013.01); *H02M 1/08* (2013.01); *H02M 3/158* (2013.01); *H04N 23/55* (2023.01); *H02M 3/157* (2013.01)

(58) Field of Classification Search
CPC ...... H02M 1/0003; H02M 1/08; H02M 3/158; H02M 3/157; G02B 27/0172; G09G 3/3614; H04N 23/55
See application file for complete search history.

(56) References Cited

U.S. PATENT DOCUMENTS

| | | | | |
|---|---|---|---|---|
| 10,877,500 | B2* | 12/2020 | Wang | G05F 1/575 |
| 11,716,027 | B2* | 8/2023 | Park | G02B 27/017 |
| | | | | 323/271 |
| 2011/0090212 | A1 | 4/2011 | Han | |
| 2012/0262437 | A1 | 10/2012 | Keller | |

(Continued)

OTHER PUBLICATIONS

International Search Report and Written Opinion received for PCT Application No. PCT/US2023/035935, Feb. 15, 2024, 13 pages.

(Continued)

*Primary Examiner* — Kyle J Moody
(74) *Attorney, Agent, or Firm* — Alleman Hall & Tuttle LLP

(57) ABSTRACT

Examples are disclosed that relate to a power supply device for controlling a liquid crystal display (LCD) panel in a reliable and power efficient manner. In one example, the power supply device includes a positive-side switching converter, a negative-side switching converter, and a controller. In an active-bias mode, the controller controls the positive-side switching converter and the negative-side switching converter to alternate a polarity of a bias voltage across a positive output node and a negative output node by alternating between a forward-bias state and a reverse-bias state. In a neutral-bias mode, the controller provides a neutral bias voltage across the positive output node and the negative output node.

20 Claims, 8 Drawing Sheets

(56) References Cited

U.S. PATENT DOCUMENTS

2014/0354349 A1* 12/2014 Liu .................... H02M 3/1588
327/536
2020/0073425 A1    3/2020 Wang
2020/0142477 A1    5/2020 Smith

OTHER PUBLICATIONS

Lee, et al., "Recent Advances in Electro-Optic Response of Polymer-Stabilized Cholesteric Liquid Crystals," Materials, vol. 16, No. 6, Mar. 10, 2023, 23 Pages.
Sun, et al., "Optical Filters Based on Cholesteric, Blue and Sphere Mesophases", Polymers, vol. 14, No. 22, Nov. 13, 2022, 16 pages.

* cited by examiner

US 12,368,364 B2

POLARITY SWITCHING POWER SUPPLY DEVICE

BACKGROUND

A camera may include an optical filter that includes a liquid crystal display (LCD) panel. The LCD panel can be positioned optically intermediate an image sensor of the camera and a scene the camera images. The LCD panel is electronically switchable between a reflection state and a transmission state. In the reflection state, the LCD panel block lights in a designated wavelength range and transmits light outside of the designated wavelength range. For example, in the reflection state, the LCD panel can block light in a visible light wavelength range and transmit light outside of the visible light wavelength range, such as light in the infrared (IR) wavelength range. In the transmission state, the LCD panel transmits light inside and outside of the designated wavelength range. In one example, the camera switches the LCD panel to the transmission state to capture visible-light images of the scene and the camera switches the LCD panel to the reflection state to capture IR images of the scene. The LCD panel is switchable between the reflection state and the transmission state to allow for the same image sensor of the camera to capture both visible-light images and IR images of the scene.

SUMMARY

Examples are disclosed that relate to a power supply device for controlling a liquid crystal display (LCD) panel in a reliable and power efficient manner. In one example, the power supply device includes a positive-side switching converter, a negative-side switching converter, and a controller. In an active-bias mode, the controller controls the positive-side switching converter and the negative-side switching converter to alternate a polarity of a bias voltage across a positive output node and a negative output node by alternating between a forward-bias state and a reverse-bias state. In a neutral-bias mode, the controller provides a neutral bias voltage across the positive output node and the negative output node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to a power supply device for controlling a liquid crystal display (LCD) panel in a reliable and power efficient manner. In particular, the power supply device is configured to selectively switch a polarity of a bias voltage across input nodes of the LCD panel during particular modes of operation to increase reliability of the LCD panel. Additionally, the power supply device has features that reduce power consumption, cost, weight, and a formfactor relative to other power supply devices.

Figure 1:
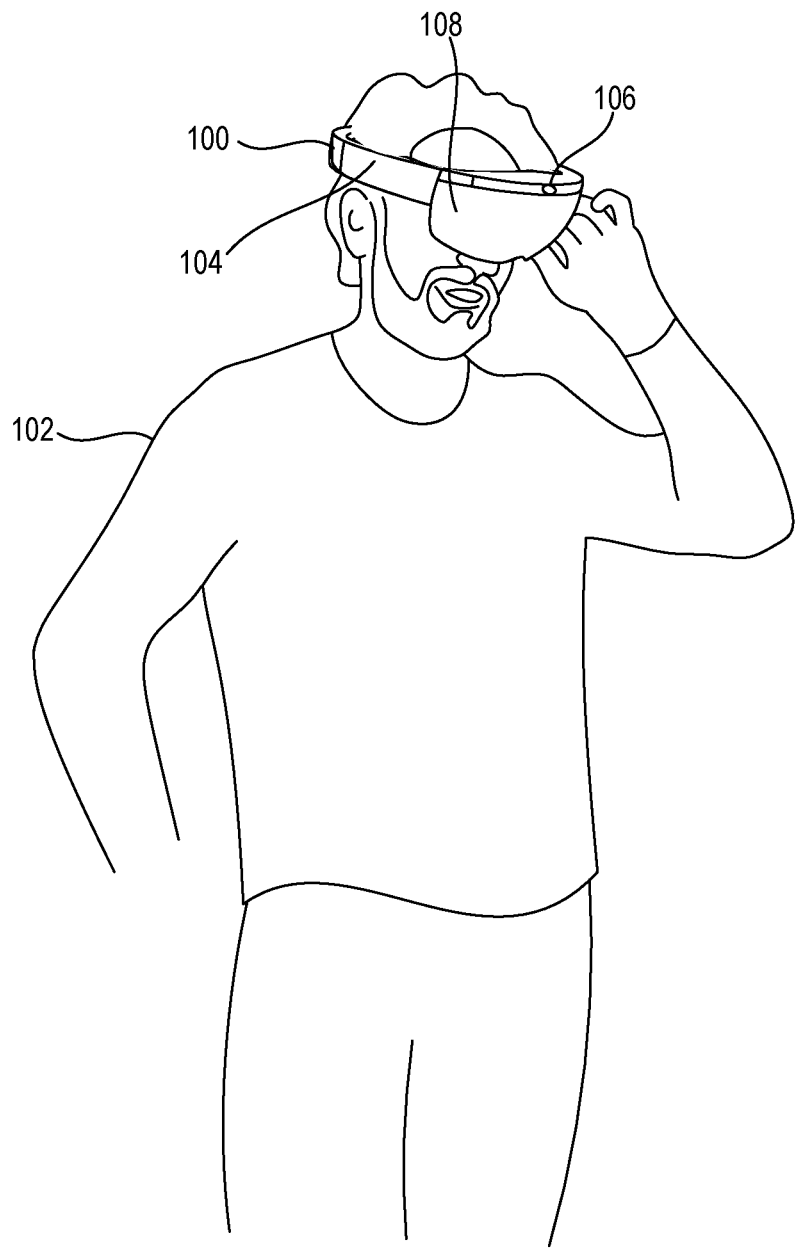
FIG. 1 shows an example head-mounted device including an outward-facing camera including a liquid crystal display (LCD) panel that is powered by a power supply device of the present disclosure.

In some implementations, the LCD panel can be employed in an optical filter of a camera. Further, in some implementations, such a camera can be used in a head-mounted device (HMD). FIG. 1 shows an example HMD 100 worn by a user 102. The HMD 100 includes a frame 104 that fits on the head of the user 102. An outward-facing camera 106 and a near-eye display 108 are mounted on the frame 104. The outward-facing camera 106 is configured to capture images of a scene in front of the user 102. The outward-facing camera 106 includes an optical filter 202 (shown in FIG. 2) including an LCD panel 208 (shown in FIG. 2) that is controlled by a power supply device 210 (shown in FIG. 2). In particular, the power supply device 210 controls the LCD panel 208 to switch between operation in a neutral-bias mode and an active-bias mode. In the neutral-bias mode, the LCD panel 208 blocks light inside a designated wavelength range and transmits light outside of the designated wavelength range—i.e., a reflection state. In the active-bias mode, the LCD panel 208 transmits light inside and outside of the designated wavelength range—i.e., a transmission state.

The outward-facing camera 106 controls the optical filter 202 to capture different types of images of the scene. For example, the outward-facing camera 106 can switch the LCD panel 208 to the neutral-bias mode to block visible light and transmit infrared (IR) light to capture IR images. In some examples, the HMD 100 can generate depth maps or provide other mapping functionality of the scene in front of the user based at least on the IR images. Further, the outward-facing camera 106 can switch the LCD panel 208 to the active-bias mode to transmit visible light to capture visible-light images of the scene.

The near-eye display 108 may be configured to present virtual imagery to provide the user 102 with a mixed reality (MR), augmented reality (AR), and/or virtual reality (VR) experience. The HMD 100 may be configured to generate and properly position such virtual imagery on the near-eye display 108 based at least on the IR images and/or the visible-light images captured by the outward-facing camera 106.

The HMD 100 is provided as a non-limiting example of a device having an optical filter including an LCD panel that is controlled by power supply device of the present disclosure. The concepts associated with the disclosed examples of LCD panels and power supply devices are broadly applicable and may be implemented in any suitable type of electronic device without departing from the scope of the present disclosure.

Figure 2:
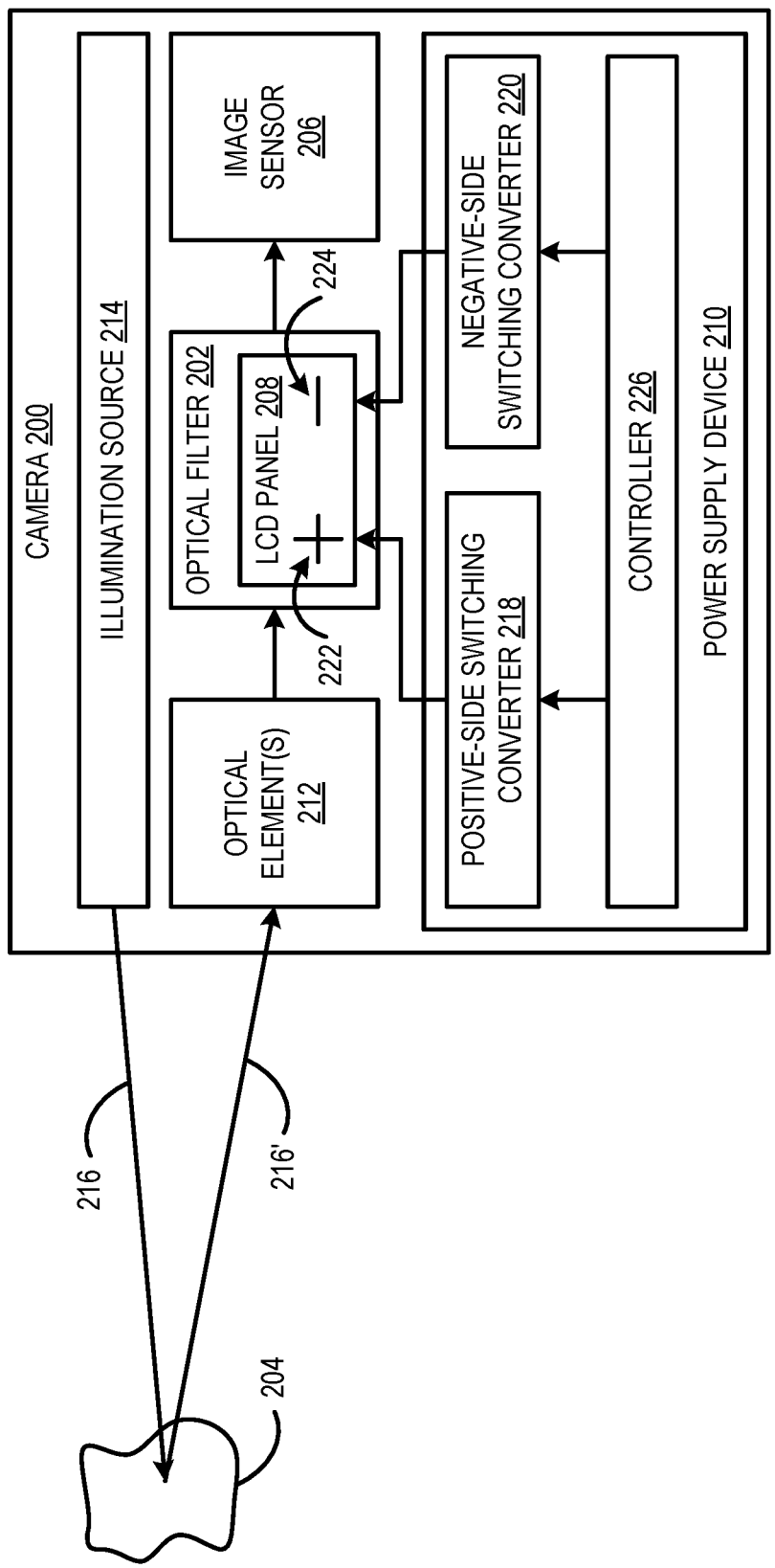
FIG. 2 shows a block diagram of an example camera including an LCD panel that is powered by a power supply device of the present disclosure.

FIG. 2 shows a block diagram of an example camera 200 including an optical filter 202. The term 'camera' refers herein to any imaging component having at least one optical aperture and an image sensor configured to image a scene 204. The camera 200 is shown in simplified form. In one example, the camera 200 is representative of the outward-facing camera 106 shown in FIG. 1. In other examples, the camera 200 may be representative of another type of camera operating in any suitable wavelength range and employing any suitable image sensing technology.

The camera 200 includes an image sensor 206 including a plurality of individually addressable pixels. Each pixel may be responsive to light over a broad wavelength band, although this is not required. The pixels of the image sensor 206 are addressable to capture an image of the scene 204.

In some implementations, the camera 200 may include one or more optical elements 212 situated optically intermediate the image sensor 206 and the scene 204. The optical element(s) 212 direct light from the scene 204 through the optical filter 202 to the image sensor 206. Alternatively or additionally, in some examples, the optical element(s) 212 can manipulate characteristics of the light from the scene. The optical element(s) 212 may take any suitable form including, but not limited to, one or more lenses, waveguides, prisms, polarizers, filters, and other optical elements. In the illustrated implementation, the optical element(s) 212 are situated optically intermediate the optical filter 202 and the scene 204. In other implementations, the optical element(s) 212 may be situated optically intermediate the optical filter 202 and the image sensor 206. In still other implementations, a one or more optical elements may be situated optically intermediate the image sensor 206 and the optical filter 202 and one or more other optical elements may be situated optically intermediate the optical filter 202 and the scene 204. In some implementations, the optical element(s) 212 may be omitted from the camera 200.

In some implementations, the camera 200 may include an illumination source 214, which, for example, may be configured to emit active IR light to illuminate the scene 204, such as for IR imaging. In this disclosure, the term 'infrared' light includes so called near-infrared (NIR) wavelengths of about 850 nm. The camera 200 may be configured to take depth measurements using IR light, including NIR light, or any other suitable wavelength.

In one example, an active IR light signal emitted from the illumination source 214 may be temporally modulated in different modulation frequencies for different IR image captures. In the illustrated example, the illumination source 214 illuminates the scene 204 with active IR light 216. IR light 216' reflects from the scene 204 back to the camera 200. The reflected IR light 216' passes through the optical element(s) 212 and the optical filter 202 and is incident on the image sensor 206 to provide a measurement. For example, the measurement may provide phase information usable with the knowledge of the camera's configuration to determine the world space position of a locus of an object in the scene 204 via time-of-flight imaging.

Alternatively or additionally, in some implementations, the illumination source 214 may be configured to emit active spectral light. In some implementations, the illumination source 214 may be configured to emit broadband spectral light to illuminate the scene 204. In some implementations, the illumination source 214 may be configured to emit active spectral light in different spectral wavelength ranges or sub-bands to illuminate the scene 204. For example, the illumination source 214 may be configured to sequentially emit active spectral light in different individual pre-defined or dynamically tuned spectral sub-bands, such as for multi-spectral or hyper-spectral imaging.

In some implementations, the camera 200 may be configured to selectively capture 'passive images' of the scene 204 where the illumination source 214 does not emit active light—i.e., when the illumination source 214 is turned off/deactivated. Under such conditions, the image sensor 206 captures passive images of the scene 204 based at least on ambient light from the scene 204. In some implementations, the illumination source 214 may be omitted from the camera 200.

The optical filter 202 is situated optically intermediate the image sensor 206 and the scene 204. The optical filter 202 includes an LCD panel 208 controlled by a power supply device 210 of the present disclosure. In particular, the power supply device 210 controls the LCD panel 208 to switch between operation in a neutral-bias mode and an active-bias mode. In the neutral-bias mode, the LCD panel 208 blocks light inside a designated wavelength range and transmits light outside of the designated wavelength range. In the active-bias mode, the LCD panel 208 transmits light inside and outside of the designated wavelength range.

The LCD panel 208 may be configured to block light in any suitable designated wavelength range when the LCD panel 208 is in the neutral-bias mode. In one example, the designated wavelength range is a visible light wavelength range. For example, the power supply device 210 can switch the LCD panel 208 to the neutral-bias mode to block visible light and transmit IR light to capture IR images. Further, the power supply device 210 can switch the LCD panel 208 to the active-bias mode to transmit visible light to capture visible-light images. In another example, the LCD panel may be configured to block all light outside of a designated wavelength range in the neutral-bias mode, such as a selected spectral light sub-band, for multi-spectral or hyper-spectral imaging. In still other examples, the designated wavelength range may include a narrowband range of wavelengths.

The power supply device 210 includes a positive-side switching converter 218 and a negative-side switching converter 220. The positive-side switching converter 218 is electrically connected to a positive input node 222 of the LCD panel 208. The negative-side switching converter 220 is electrically connected to a negative input node 224 of the LCD panel 208. The power supply device 210 includes a controller 226 that cooperatively controls operation of both the positive-side switching converter 218 and the negative-side switching converter 220 to switch the LCD panel 208 between operation in the neutral-bias mode and the active-bias mode. In the active-bias mode, the controller 226 alternates between a forward-bias state and a reverse-bias state. In the forward-bias state, the controller 226 controls the positive-side switching converter 218 to modulate an input voltage to provide a positive-side bias voltage at the positive input node 222 of the LCD panel 208 and controls the negative-side switching converter 220 to provide a zero-bias voltage at the negative input node 224 of the LCD panel 208. When the positive-side bias voltage is provided at the positive input node and the zero-bias voltage is provided to the negative input node, a positive bias voltage is provided across the positive and negative input nodes in the forward-bias state. In the reverse-bias state, the controller 226 controls the negative-side switching converter 220 to modulate the input voltage to provide a negative-side bias voltage at the negative input node 224 of the LCD panel 208 and controls the positive-side switching converter 218 to provide a zero-bias voltage at the positive input node 222 of the LCD panel 208. Note that the negative-side bias voltage is a positive (+) voltage. However, when the zero-bias voltage is provided at the positive input node and the negative-side bias voltage is provided at the negative input node, a negative bias voltage occurs across the positive and negative input nodes in the reverse-bias state. The controller 226 can alternate between the forward-bias state and the reverse-bias state according to any suitable frequency/switching rate.

Controlling the power supply device 210 to alternate between the forward-bias state and the reverse-bias state when the LCD panel 208 operates in the active-bias mode causes a polarity of the bias voltage across the input nodes 222, 224 of the LCD panel 208 to alternate. Alternating the polarity of the bias voltage across the input nodes 222, 224 of the LCD panel 208 according to this control scheme provides the technical benefit of improving reliability of the LCD panel 208 relative to a power supply device that controls an LCD panel with a single polarity voltage control scheme. In particular, alternating the polarity of the bias voltage while the LCD panel 208 operates in the active-bias mode reduces degradation of the liquid crystal (LC) material in the LCD panel 208 relative to a single polarity voltage control scheme in which the bias voltage has the same polarity during the course of operation in the active-bias mode.

Controlling both the positive-side switching converter 218 and the negative-side switching converter 220 with the single integrated controller 226 of the power supply device 210 provides the technical benefit of reducing power consumption, cost, weight, and a formfactor of the power supply device 210 relative to other power supply devices that employ two separate dedicated controllers to control two switching converters.

In some implementations, the power supply device 210 may have a small enough form factor to be integrated into a power management integrated circuit (IC) that is mounted on-board the LCD panel 208 itself. Such integration may allow for an overall reduction in form factor of the camera 200 and reduced power consumption relative to an off-board configuration in which a power supply device for controlling an LCD panel is mounted on a separate off-board hardware panel. In other implementations, the power supply device 210 may be mounted on a separate hardware panel that is electrically connected to the LCD panel 208.

Figure 3:
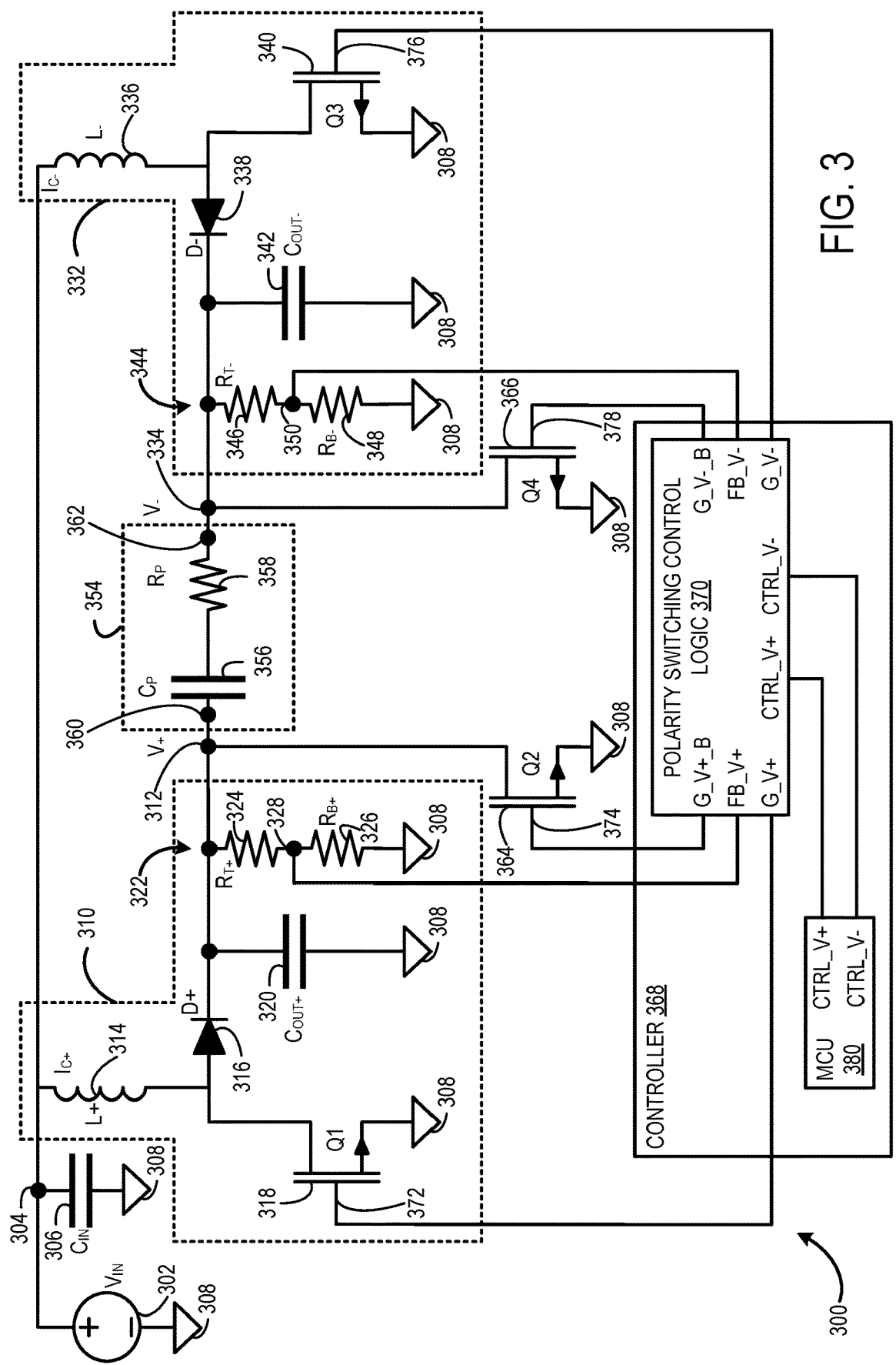
FIG. 3 shows a circuit diagram of an example power supply device of the present disclosure.

FIG. 3 shows a circuit diagram of an example power supply device 300 of the present disclosure. In one example, the power supply device 300 is representative of the power supply device 210 shown in FIG. 2. The power supply device 300 is configured to drive an LCD panel (or any other suitable system load) with different polarity bias voltages. The power supply device 300 comprises a voltage source 302 configured to generate an input voltage ($V_{IN}$) at a switching converter input node 304. In one example, the input voltage is 5 volts. In other examples, the input voltage may be another voltage. The voltage source 302 may take any suitable form. For example, the voltage source 302 may be a direct current (DC) voltage source. In some examples, the voltage source may comprise an output of a digital micro-controller. In other examples, the voltage source may comprise a discrete electronic component. In yet another example, the voltage source may comprise one or more batteries.

A switching converter input capacitor 306 is electrically intermediate the switching converter input node 304 and a ground node 308. The switching converter input capacitor 306 has a capacitance ($C_{IN}$). In one example, the capacitance ($C_{IN}$) is selected to minimize effects of voltage ripple at the switching converter input node 304. The ground node 308 may be set to any suitable reference voltage. In one example, the reference voltage of the ground node is set to zero volts.

A positive-side switching converter 310 is electrically connected to the switching converter input node 304, which is electrically connected to the voltage source 302. The positive-side switching converter 310 is further electrically connected to a positive output node 312 of the power supply device 300. In this way, the positive-side switching converter 310 is electrically connected between the voltage source 302 and the positive output node 312. A positive-side inductor 314 is electrically connected to the switching converter input node 304. The positive-side inductor 314 has an inductance ($L_+$). A positive-side diode 316 is electrically intermediate the positive-side inductor 314 and the positive output node 312. A positive-side converter switch (Q1) 318 is electrically intermediate the positive-side inductor 314 and the ground node 308. A positive-side output capacitor 320 is electrically intermediate the positive output node 312 and the ground node 308. The positive-side output capacitor 320 has a capacitance ($C_{OUT+}$). In one example, the capacitance ($C_{OUT+}$) is selected to minimize effects of voltage ripple at the positive output node 312.

The positive-side switching converter 310 is configured to modulate voltage generated by the voltage source 302 from one voltage level (i.e., $V_{IN}$) to another voltage level by periodically storing energy in the positive-side inductor 314 and then releasing the stored energy to the positive output node 312 at a different voltage level (i.e., $V_-$) than the input voltage ($V_{IN}$).

The positive-side switching converter 310 can be any suitable type of switching converter depending on the operational specifications of the device in which the power supply device 300 is implemented. In the illustrated implementation, the positive-side switching converter 310 is a boost switching converter that is configured to step up a lower input voltage ($V_{IN}$) to a higher positive-side bias voltage ($V_+$). In one example, the positive-side bias voltage ($V_+$) is 200 volts. In other examples, the positive-side bias voltage ($V_+$) may be another suitable voltage. In other implementations, the positive-side switching converter 310 may include a different type of switching converter, such as a buck switching converter or a buck-boost switching converter.

In some examples, the inductance ($L_+$) of the positive-side inductor 314 and the capacitance ($C_{OUT+}$) of the positive-side output capacitor 320 may be selected based on the input voltage ($V_{IN}$) and the positive-side bias voltage ($V_+$) that are designated based on the design of the device in which the power supply device 300 is implemented. Further, these passive components can be arranged in a variety of ways to realize boost, buck, or buck-boost types of switching converter configurations.

The positive-side switching converter 310 is configured to switch between an ON state and an OFF state to modulate the input voltage ($V_{IN}$) and provide the positive-side bias voltage ($V_+$) at the positive output node 312. The power supply device 300 is configured such that when the positive-side switching converter 310 is in the ON state the positive-side inductor 314 is charged with a charging current ($I_{C+}$) that is stored in a magnetic field of the positive-side inductor 314. The power supply device 300 is further configured such that when the positive-side switching converter 310 is in the OFF state, the magnetic field of the positive-side inductor 314 collapses such that the positive-side switching converter 310 modulates the input voltage ($V_{IN}$) to provide the positive-side bias voltage ($V_+$) at the positive output node 312.

In some implementations, the positive-side switching converter 310 may include a second switch in place of the positive-side diode 316. Further, in some implementations, the second switch of the positive-side switching converter 310 may include a transistor and the positive-side switching converter 310 may be synchronously rectified via the transistor.

The positive-side switching converter 310 further comprises a positive-side feedback resistor divider 322 electrically connected between the positive output node 312 and the ground node 308. The positive-side feedback resistor divider 322 includes a first resistor 324 electrically connected in series with a second resistor 326. The first resistor 324 is electrically connected between the positive output node 312 and a positive-side switching converter feedback node 328. The first resistor 324 has a resistance ($R_{T+}$). The second resistor 326 is electrically connected between the positive-side switching converter feedback node 328 and the ground node 308. The second resistor 326 has a resistance ($R_{B+}$). The positive-side feedback resistor divider 322 produces a feedback voltage (FB_$V_+$) that is proportional to the positive-side bias voltage ($V_+$) based on the resistances ($R_{T+}$) and ($R_{B+}$). The positive-side switching converter 310 is configured to modulate the positive-side bias voltage ($V_+$) based on the feedback voltage (FB_$V_+$) measured via the positive-side resistor divider 322. For example, the positive-side switching converter 310 may increase the duty cycle based on the positive-side bias voltage ($V_+$) being less than a desired voltage level and vice versa. In this way, the positive-side switching converter 310 modulates the input voltage ($V_{IN}$) to provide the positive-side bias voltage ($V_+$) at the positive output node 312.

In the illustrated implementation, the positive-side feedback resistor divider 322 is provided as an example of a two-resistor type resistor ladder. The power supply device 300 may include a positive-side resistor ladder including any suitable number of resistors. For example, the power supply device 300 may include a positive-side resistor ladder having more than two resistors. Further, the resistors may be selected to provide a desired positive-side bias voltage ($V_+$) at the positive output node 312. In such implementations, the positive-side bias voltage ($V_+$) is based at least on resistances of resistors of the positive-side resistor ladder.

A negative-side switching converter 332 is electrically connected to the switching converter input node 304, which is electrically connected to the voltage source 302. The negative-side switching converter 332 is further electrically connected to a negative output node 334 of the power supply device 300. In this way, the negative-side switching converter 332 is electrically connected between the voltage source 302 and the negative output node 334. A negative-side inductor 336 is electrically connected to the switching converter input node 304. The negative-side inductor 336 has an inductance ($L_-$). A negative-side diode 338 is electrically intermediate the negative-side inductor 336 and the negative output node 334. A negative-side converter switch (Q3) 340 is electrically intermediate the negative-side inductor 336 and the ground node 308. A negative-side output capacitor 342 is electrically intermediate the negative output node 334 and the ground node 308. The negative-side output capacitor 342 has a capacitance ($C_{OUT-}$). In one example, the capacitance ($C_{OUT-}$) is selected to minimize effects of voltage ripple at the negative output node 334.

The negative-side switching converter 332 is configured to modulate voltage generated by the voltage source 302 from one voltage level (i.e., $V_{IN}$) to another voltage level by periodically storing energy in the negative-side inductor 336 and then releasing the stored energy to the negative output node 334 at a different voltage level (i.e., $V_-$) than the input voltage ($V_{IN}$).

The negative-side switching converter 332 can be any suitable type of switching converter depending on the operational specifications of the device in which the power supply device 300 is implemented. In the illustrated implementation, the negative-side switching converter 332 is a boost switching converter that is configured to step up a lower input voltage ($V_{IN}$) to a higher negative-side bias voltage ($V_-$). In one example, the negative-side bias voltage ($V_-$) is 200 volts. In other examples, the negative-side bias voltage ($V_-$) may be a different voltage. Note that the negative-side bias voltage ($V_-$) is a positive (+) voltage that is provided at the negative output node 334. In other implementations, the negative-side switching converter 332 may include a different type of switching converter, such as a buck switching converter or a buck-boost switching converter.

In some examples, the inductance ($L_-$) of the negative-side inductor 336 and the capacitance ($C_{OUT-}$) of the negative-side output capacitor 342 may be selected based on the input voltage ($V_{IN}$) and the negative-side bias voltage ($V_-$) that are designated based on the design of the device in which the power supply device 300 is implemented. Further, these passive components can be arranged in a variety of ways to realize boost, buck, or buck-boost types of switching converter configurations.

The negative-side switching converter 332 is configured to switch between an ON state and an OFF state to modulate the input voltage ($V_{IN}$) and provide the negative-side bias voltage ($V_-$) at the negative output node 334. The power supply device 300 is configured such that when the negative-side switching converter 332 is in the ON state the negative-side inductor 336 is charged with a charging current ($I_{C-}$) that is stored in a magnetic field of the negative-side inductor 336. The power supply device 300 is further configured such that when the negative-side switching converter 332 is in the OFF state, the magnetic field of the negative-side inductor 336 collapses such that the negative-side switching converter 332 modulates the input voltage ($V_{IN}$) to provide the negative-side bias voltage ($V_-$) at the negative output node 334.

In some implementations, the negative-side switching converter 332 may include a second switch in place of the negative-side diode 338. Further, in some implementations, the second switch of the negative-side switching converter 332 may include a transistor and the negative-side switching converter 332 may be synchronously rectified via the transistor.

The negative-side switching converter 332 further comprises a negative-side feedback resistor divider 344 electrically connected between the negative output node 334 and the ground node 308. The negative-side feedback resistor divider 344 includes a first resistor 346 electrically connected in series with a second resistor 348. The first resistor 346 is electrically connected between the negative output node 334 and a negative-side switching converter feedback node 350. The first resistor 346 has a resistance ($R_{T-}$). The second resistor 348 is electrically connected between the negative-side switching converter feedback node 350 and the ground node 308. The second resistor 348 has a resistance ($R_{B-}$). The negative-side feedback resistor divider 344 produces a feedback voltage (FB_$V_-$) that is proportional to the negative-side bias voltage ($V_-$) based on the resistances ($R_{T-}$) and ($R_{B-}$). The negative-side switching converter 332 is configured to modulate the negative-side bias voltage ($V_-$) based on the feedback voltage (FB_$V_-$) measured via the negative-side feedback resistor divider 344. For example, the negative-side switching converter 332 may increase the duty cycle based on the negative-side bias voltage (V−) being less than a desired voltage level and vice versa. In this way, the negative-side switching converter 332 modulates the input voltage ($V_{IN}$) to provide the negative-side bias voltage (V−) at the negative output node 334.

In the illustrated implementation, the negative-side feedback resistor divider 344 is provided as an example of a two-resistor type resistor ladder. The power supply device 300 may include a negative-side resistor ladder including any suitable number of resistors. For example, the power supply device 300 may include a negative-side resistor ladder having more than two resistors. Further, the resistors may be selected to provide a desired negative-side bias voltage (V−) at the negative output node 334. In such implementations, the negative-side bias voltage (V−) is based at least on resistances of resistors of the negative-side resistor ladder.

An LCD panel 354 is electrically connected to the power supply device 300. A system load of the LCD panel 354 is represented by a panel capacitor 356 in series with a panel resistor 358. The panel capacitor 356 has a capacitance ($C_P$). The panel resistor 358 has a resistance ($R_P$). The LCD panel 354 includes a positive input node 360 and a negative input node 362. The positive output node 312 of the power supply device 300 is electrically connected to the positive input node 360 of the LCD panel 354 and the negative output node 334 of the power supply device 300 is electrically connected to the negative input node 362 of the LCD panel 354.

The power supply device 300 includes a positive-side switch (Q2) 364 and a negative-side switch (Q4) 366. The positive-side switch (Q2) 364 is electrically connected between the positive output node 312 and the ground node 308. The negative-side switch (Q4) 366 is electrically connected between the negative output node 334 and the ground node 308.

The power supply device 300 includes a controller 368 configured to control the LCD panel 354 to switch between operation in the neutral-bias mode and the active-bias mode. In the neutral-bias mode, the LCD panel 354 blocks light inside a designated wavelength range and transmits light outside of the designated wavelength range. In the active-bias mode, the LCD panel 354 transmits light inside and outside of the designated wavelength range. For example, the controller 368 may switch the LCD panel 354 between operation in the neutral-bias mode and the active-bias mode to selectively filter light in the designated wavelength range that allows the camera 200 (shown in FIG. 2) to capture different types of images (e.g., visible-light images, IR images).

Figure 4:
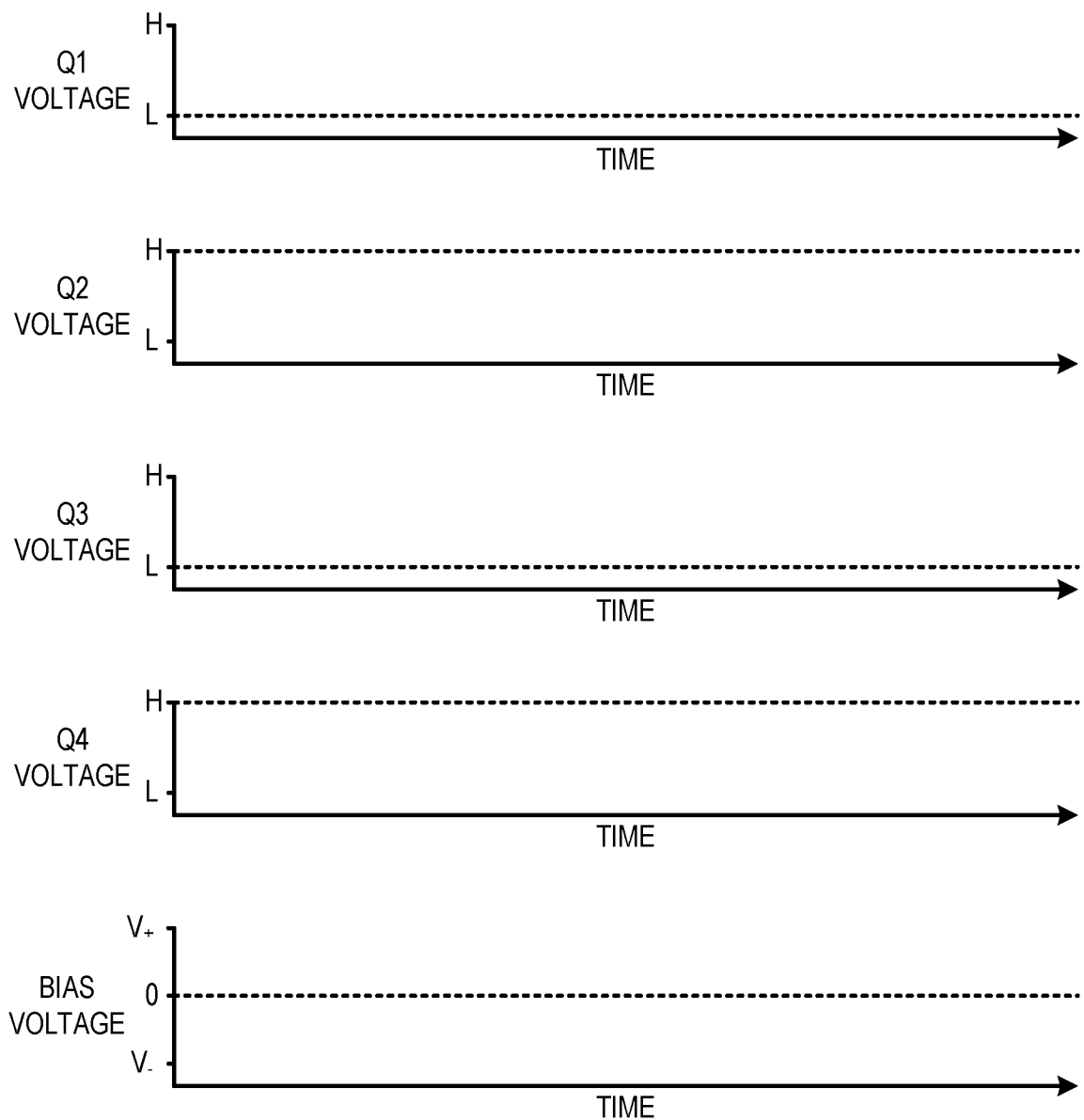
FIGS. 4-6 show timing diagrams of example controls signals of a power supply device of the present disclosure.
Figure 5:
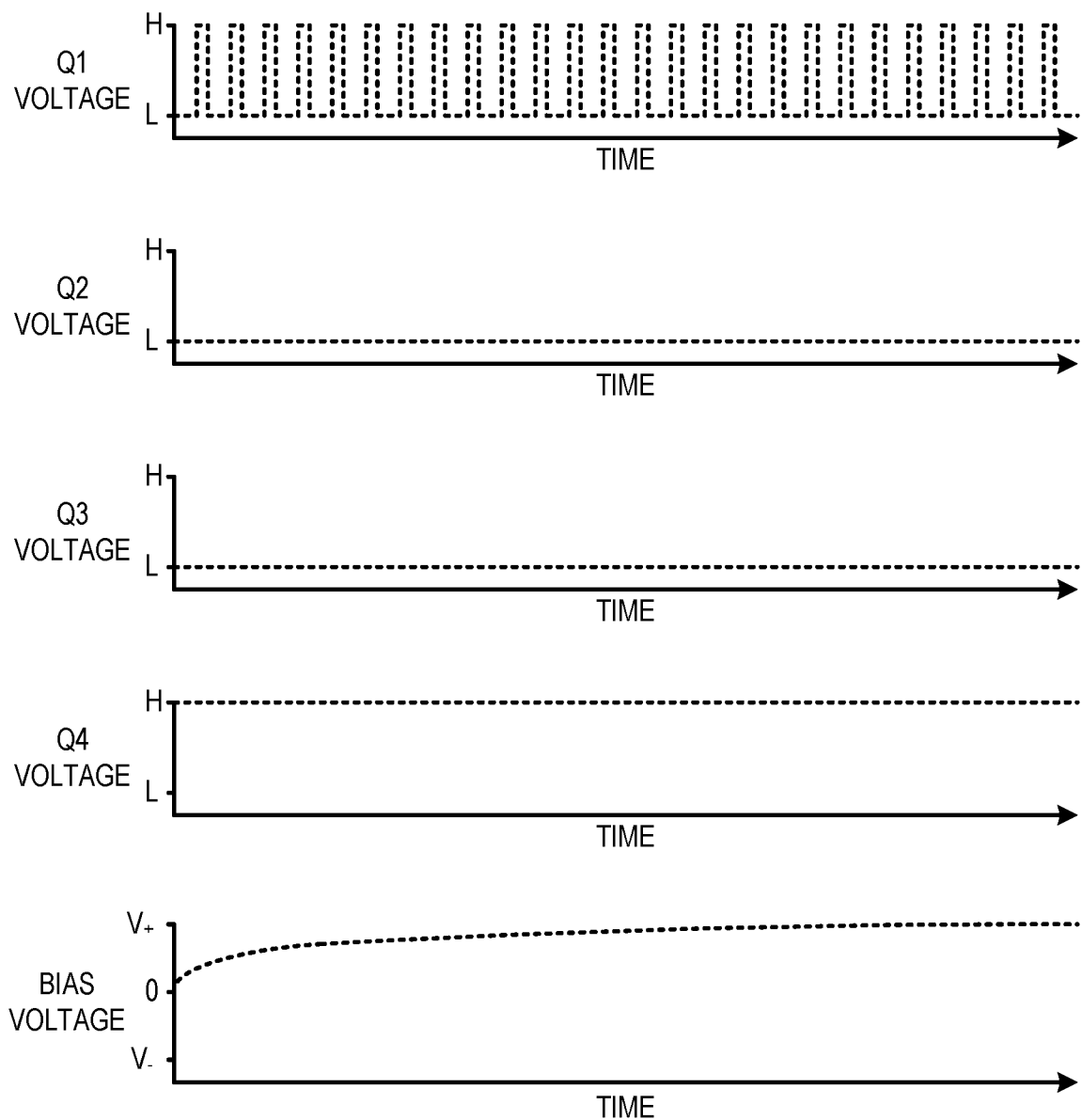
Figure 6:
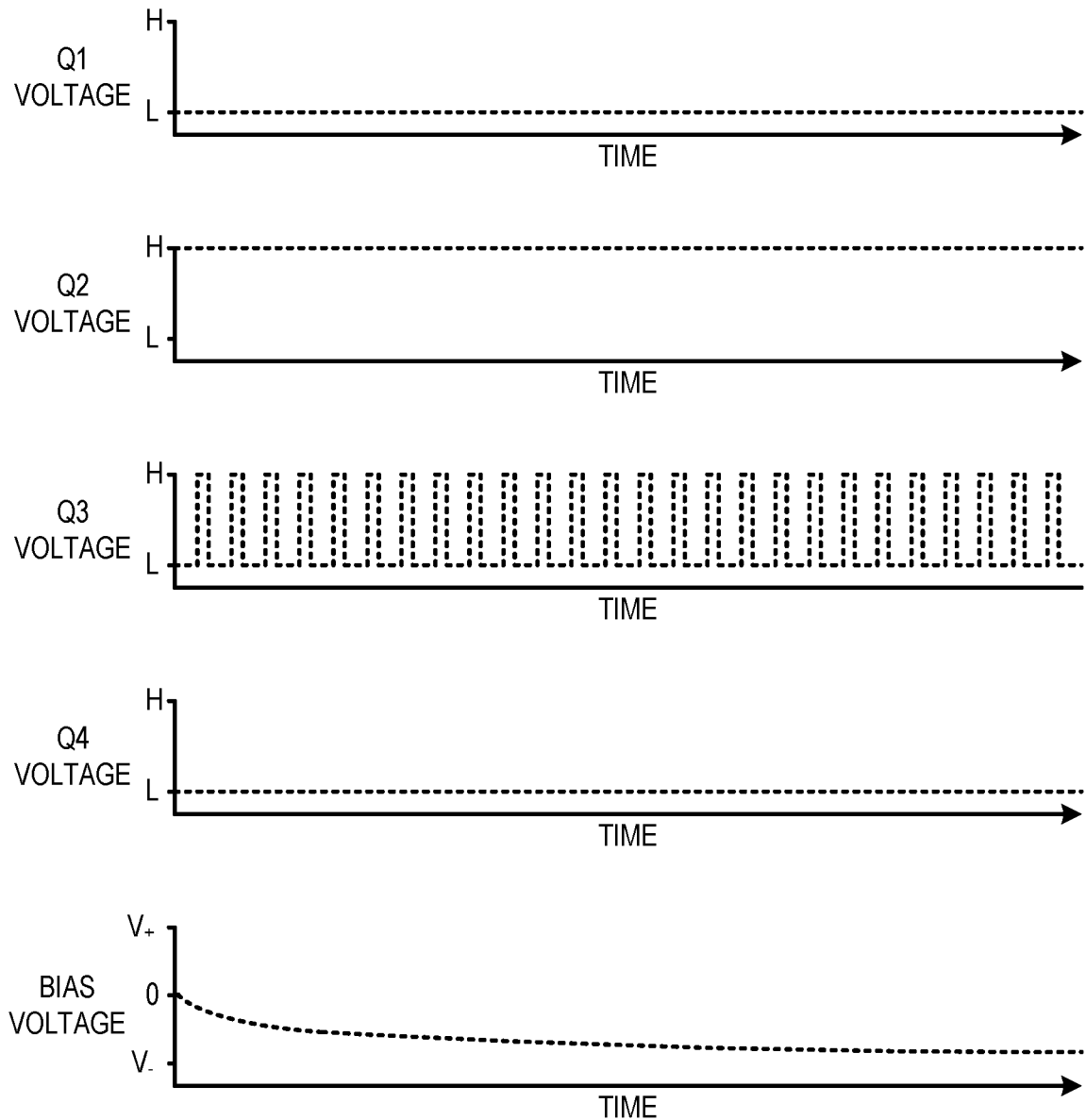

FIGS. 4-6 show timing diagrams of example controls signals output by the controller 368 to control operation of the power supply device in the neutral-bias mode and the active-bias mode.

As shown in FIG. 4, in the neutral-bias mode, the controller 368 switches the positive-side switch (Q2) 364 to an ON state in which the gate voltage goes high to electrically ground the positive output node 312 and switches the negative-side switch (Q4) 366 to an ON state in which the gate voltage goes high to electrically ground the negative output node 334. Further, the controller 368 switches the positive-side converter switch (Q1) 318 to an OFF state in which the voltage goes low and switches the negative-side converter switch (Q3) 340 to an OFF state in which the voltage goes low. When both the positive input node 360 and the negative input node 362 of the LCD panel 354 are grounded, a neutral bias voltage is provided across the two input nodes of the LCD panel 354, such that the LCD panel 354 is in the neutral-bias mode.

In the active-bias mode, the power supply device 300 is configured to provide a bias voltage at either of the positive output node 312 (e.g., a forward-bias state) or the negative output node 334 (e.g., a reverse-bias state). More specifically, the power supply device 300 is configured to alternate the polarity of the bias voltage across the positive output node 312 and the negative output node 334 by alternating between the forward-bias state and the reverse-bias state.

As shown in FIG. 5, in the forward-bias state of the active-bias mode, the controller 368 switches the positive-side switch (Q2) 364 to an OFF state in which the voltage goes low. The controller 368 controls the positive-side switching converter 310 to modulate the input voltage ($V_{IN}$) to provide the positive-side bias voltage (V+) at the positive output node 312. In the illustrated example, the controller 368 controls the positive-side switching converter 310 to modulate the input voltage by periodically switching the positive-side converter switch (Q1) 318 between an OFF state and an ON state to store energy in the positive-side inductor 314 and then release the stored energy to the positive output node 312. The controller 368 may control the positive-side switching converter 310 to modulate the input voltage ($V_{IN}$) according to any suitable control scheme to provide a desired positive-side bias voltage ($V_+$) at the positive output node 312.

In some implementations, the positive-side converter switch (Q1) 318 may be controlled with a duty cycle that dictates a percentage of time that the positive-side switching converter 310 operates in the ON state relative to the OFF state. In other implementations, the positive-side switching converter 310 may be controlled based on a frequency of a control signal, such that an amount of time that the switching converter operates in the ON state and the OFF state is adjusted by adjusting the frequency of the control signal. In some implementations, two or more of the above example control schemes may be used in conjunction to control operation of the positive-side switching converter 310. In yet other examples, a different control scheme may be employed.

Additionally, in the forward-bias state, the controller 368 switches the negative-side switch (Q4) 366 to the ON state in which the voltage goes high to ground the negative output node 334 and switches the negative-side converter switch (Q3) to the OFF state in which the voltage goes low to provide a zero-bias voltage at the negative output node 334. In this way, a positive bias voltage is provided across the input nodes of the LCD panel 354 in the forward-bias state of the active-bias mode.

As shown in FIG. 6, in the reverse-bias state of the active-bias mode, the controller 368 switches the negative-side switch (Q4) 366 to an OFF state in which the voltage goes low. The controller 368 controls the negative-side switching converter 332 to modulate the input voltage ($V_{IN}$) to provide the negative-side bias voltage (V−) at the negative output node 334. In the illustrated example, the controller 368 controls the negative-side switching converter 332 to modulate the input voltage by periodically switching the negative-side converter switch (Q3) 340 between an OFF state and an ON state to store energy in the negative-side inductor 336 and then release the stored energy to the negative output node 334. The controller 368 may control the negative-side switching converter 332 to modulate the input voltage ($V_{IN}$) according to any suitable control scheme to provide a desired negative-side bias voltage ($V_-$) at the negative output node 334.

In some implementations, the negative-side converter switch (Q3) 340 may be controlled with a duty cycle that dictates a percentage of time that the negative-side switching converter 332 operates in the ON state relative to the OFF state. In other implementations, the negative-side switching converter 332 may be controlled based on a frequency of a control signal, such that an amount of time that the switching converter operates in the ON state and the OFF state is adjusted by adjusting the frequency of the control signal. In some implementations, two or more of the above example control schemes may be used in conjunction to control operation of the negative-side switching converter 332. In yet other examples, a different control scheme may be employed.

Additionally, in the reverse-bias state, the controller 368 switches the positive-side switch (Q2) 364 to the ON state in which the voltage goes high to ground the positive output node 312 to provide a zero-bias voltage at the positive output node 312. In this way, a negative bias voltage is provided across the input nodes of the LCD panel 354 in the reverse-bias state of the active-bias mode.

Alternating the polarity of the bias voltage across the input nodes 360, 362 of the LCD panel 354 in the active-bias mode according to this control scheme provides the technical benefit of improving reliability of the LCD panel 354 relative to a power supply device that controls an LCD panel with a single polarity voltage control scheme. In particular, alternating the polarity of the bias voltage while the LCD panel 354 operates in the active-bias mode reduces degradation of the liquid crystal (LC) material in the LCD panel 354 relative to a single polarity voltage control scheme in which the bias voltage has the same polarity during the course of operation in the active-bias mode.

In the illustrated implementation, the controller 368 includes polarity switching control logic 370 configured to control operation of the switches of the power supply device 300 according to the control scheme of the present disclosure. The polarity switching control logic 370 is electrically connected to the positive-side switching converter feedback node 328 to receive the positive-side feedback voltage (FB_$V_+$). The polarity switching control logic 370 is electrically connected to the negative-side switching converter feedback node 350 to receive the negative-side feedback voltage (FB_$V_-$). The polarity switching control logic 370 is electrically connected to a gate 372 of the positive-side converter switch (Q1) 318. The polarity switching control logic 370 is electrically connected to a gate 374 of the positive-side switch (Q2) 364. The polarity switching control logic 370 is electrically connected to a gate 376 of the negative-side converter switch (Q3) 340. The polarity switching control logic 370 is electrically connected to a gate 378 of the negative-side switch (Q4) 366. The controller 368 further includes a micro-controller unit (MCU) 380 configured to output a positive-side voltage control signal (CTRL_$V_+$) and a negative-side voltage control signal (CTRL_$V_-$) to the polarity switching control logic 370.

Figure 7:
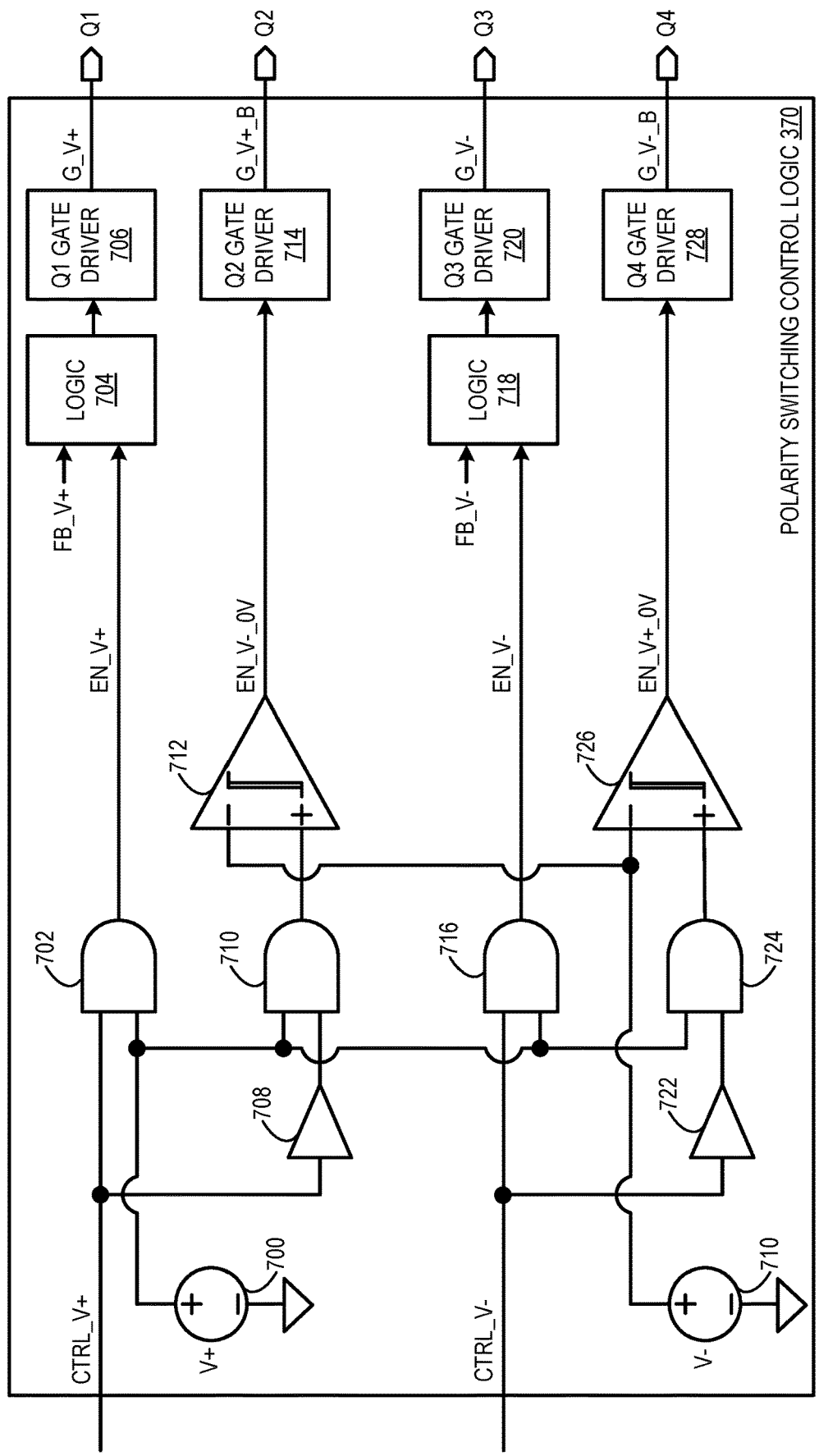
FIG. 7 shows a circuit diagram of example polarity switching control logic for controlling a power supply device of the present disclosure.

FIG. 7 shows a circuit diagram of the polarity switching control logic 370. The polarity switching control logic 370 includes a positive-side voltage source 700 that generates a positive-side input voltage ($V_+$). In one example, the positive-side input voltage ($V_+$) is 5 volts. In other examples, the positive-side input voltage ($V_+$) is another voltage. An AND gate 702 outputs a positive-side enable signal (EN_V+) to positive-side control logic 704 based at least on the positive-side voltage control signal (CTRL_$V_+$) and the positive-side input voltage ($V_+$). The positive-side control logic 704 outputs a control signal to a Q1 gate driver 706 based at least on the positive-side enable signal (EN_V+) and the positive-side feedback voltage (FB_$V_+$). The Q1 gate driver 706 outputs a control signal (G_V+) to control operation of the positive-side converter switch (Q1) 318 (shown in FIG. 3) based at least on the control signal output from the positive-side control logic 704.

Further, the positive-side voltage control signal (CTRL_$V_+$) is inverted by an inverter 708. An AND gate 710 produces an output based at least on the inverted positive-side voltage control signal (CTRL_$V_+$) and the positive-side input voltage ($V_+$). The output of the AND gate 710 is provided to a positive input of a positive-side amplifier 712. A negative-side voltage source generates a negative-side input voltage ($V_-$). In one example, the negative-side input voltage ($V_-$) is 0.5 volts. In other examples, the negative-side input voltage ($V_-$) is another voltage. The negative-side input voltage ($V_-$) is provided at a negative input of the positive-side amplifier 712. The positive-side amplifier 712 outputs an enable signal (EN_V−_0V) to a Q2 gate driver 714. The Q2 gate driver 714 outputs a control signal (G_V+_B) to control operation of the positive-side switch (Q2) 364 (shown in FIG. 3) based at least on the enable signal (EN_V−_0V).

An AND gate 716 outputs a negative-side enable signal (EN_V−) to negative-side control logic 718 based at least on the negative-side voltage control signal (CTRL_$V_-$) and the positive-side input voltage ($V_+$). The negative-side control logic 718 outputs a control signal to a Q3 gate driver 720 based at least on the negative-side enable signal (EN_V−) and the negative-side feedback voltage (FB_$V_-$). The Q3 gate driver 720 outputs a control signal (G_V−) to control operation of the negative-side converter switch (Q3) 340 (shown in FIG. 3) based at least on the control signal output from the negative-side control logic 718.

Further, the negative-side voltage control signal (CTRL_$V_-$) is inverted by an inverter 722. An AND gate 724 produces an output based at least on the inverted negative-side voltage control signal (CTRL_$V_-$) and the negative-side input voltage ($V_-$). The output of the AND gate 710 is provided to a positive input of a negative-side amplifier 726. The negative-side input voltage ($V_-$) is provided at a negative input of the negative-side amplifier 726. The negative-side amplifier 726 outputs an enable signal (EN_$V_+$_0V) to a Q4 gate driver 728. The Q4 gate driver 728 outputs a control signal (G_V−_B) to control operation of the negative-side switch (Q2) 366 (shown in FIG. 3) based at least on the enable signal (EN_V+_0V).

The polarity switching control logic 370 allows for switches Q1-Q4 to be controlled with a single integrated controller i.e.,—micro-controller unit 380. Such a configuration provides the technical benefit of reducing power consumption, cost, weight, and a formfactor of the power supply device 300 relative to other power supply devices that employ two separate dedicated controllers to control two switching converters and two switches. Additionally, by controlling both switching converters using a single controller provides the technical benefit of eliminating timing errors and/or timing delays that could otherwise occur when two separate controllers are used to individually control the switching converters of the power supply device.

The polarity switching control logic 370 is provided as a non-liming example. In other implementations, the controller 368 can employ another suitable configuration to control operation of the power supply device 300.

Figure 8:
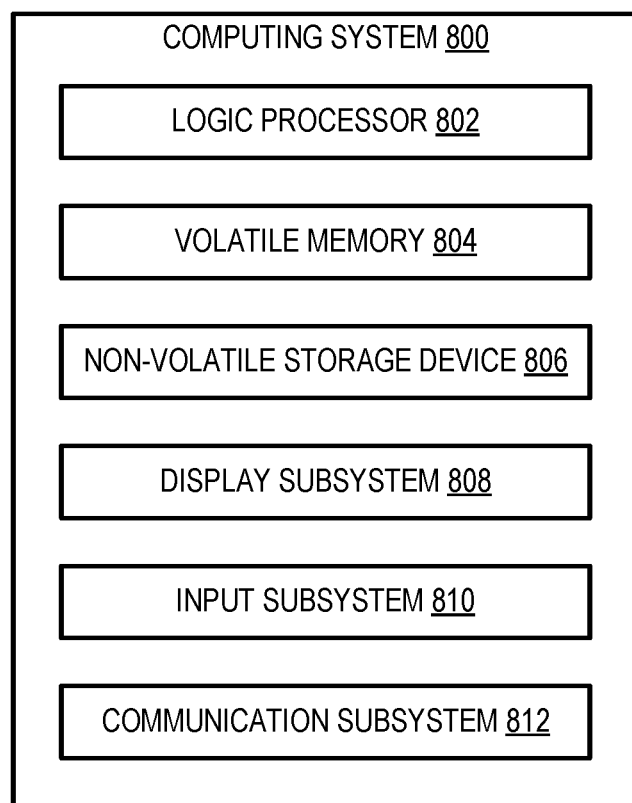
FIG. 8 shows an example computing system.

FIG. 8 schematically shows a non-limiting implementation of a computing system 800 that can enact one or more of the control schemes described above. Computing system 800 is shown in simplified form. Computing system 800 may embody the HMD 100 shown in FIG. 1, the camera 200 shown in FIG. 2, and any other suitable device that includes the power supply device of the present disclosure. Computing system 800 may take the form of one personal computers, server computers, tablet computers, home-entertainment computers, network computing devices, gaming devices, mobile computing devices, mobile communication devices (e.g., smart phone), and/or other computing devices, and wearable computing devices such as head-mounted, near-eye augmented/mixed/virtual reality devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 802 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, microphone for speech and/or voice recognition, a camera (e.g., a webcam), or game controller.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 800 to send and/or receive messages to and/or from other devices via a network such as the Internet.

In an example, a power supply device, comprises a voltage source configured to generate an input voltage, a positive output node, a negative output node;
  a positive-side switching converter electrically connected between the voltage source and the positive output node, a negative-side switching converter electrically connected between the voltage source and the negative output node, and a controller configured to in an active-bias mode, alternate a polarity of a bias voltage across the positive output node and the negative output node by alternating between a forward-bias state and a reverse-bias state, in the forward-bias state, control the positive-side switching converter to modulate the input voltage to provide a positive-side bias voltage at the positive output node and provide a zero-bias voltage at the negative output node, and in the reverse-bias state, control the negative-side switching converter to modulate the input voltage to provide a positive-side bias voltage at the negative output node and provide a zero-bias voltage at the positive output node, and in a neutral-bias mode, provide a neutral bias voltage across the positive-side output node and the negative-side output node. In this example and/or other examples, the positive output node may be electrically connected to a positive input node of a liquid crystal display (LCD) panel and the negative output node may be electrically connected to a negative input node of the LCD panel. In this example and/or other examples, in the active-bias mode, the LCD panel may transmit light inside and outside of a designated wavelength range and in the neutral-bias mode the LCD panel may block light in the designated wavelength range. In this example and/or other examples, the power supply device may further comprise a positive-side switch electrically connected between the positive output node and a ground node, and a negative-side switch electrically connected between the negative output node and the ground node, the controller may be configured to, in the neutral-bias mode, switch the positive-side switch to an ON state to electrically ground the positive output node, and switch the negative-side switch to an ON state to electrically ground the negative output node. In this example and/or other examples, the controller may be configured to, in the forward-bias state, switch the negative-side switch to the ON state to electrically ground the negative output node, and in the reverse-bias state, switch the positive-side switch to the ON state to electrically ground the positive output node. In this example and/or other examples, the positive-side switching converter may be electrically connected to a positive-side feedback node, the power supply device may further comprise a positive-side feedback resistor divider electrically connected between the positive output node and the positive-side feedback node, and the positive-side switching converter may be configured to modulate the input voltage to provide the positive-side bias voltage based at least on a feedback voltage measured via the positive-side resistor divider. In this example and/or other examples, the negative-side switching converter may be electrically connected to a negative-side feedback node, the power supply device may further comprise a negative-side feedback resistor divider electrically connected between the negative output node and the negative-side feedback node, and the negative-side switching converter may be configured to modulate the input voltage to provide the negative-side bias voltage based at least on a feedback voltage measured via the negative-side resistor divider. In this example and/or other examples, the power supply device may further comprise a positive-side resistor ladder electrically intermediate the positive-side switching converter and the positive output node, wherein the positive-side bias voltage is based at least on resistances of resistors of the positive-side resistor ladder, and a negative-side resistor ladder electrically intermediate the negative-side switching converter and the negative output node, wherein the negative-side bias voltage is based at least on resistances of resistors of the negative-side resistor ladder. In this example and/or other examples, the positive-side switching converter may include a boost switching converter and the negative-side switching converter may include a boost switching converter.

In another example, a camera, comprises an image sensor, a liquid crystal display (LCD) panel optically intermediate the image sensor and a scene, the LCD panel including a positive input node and a negative input node, and a power supply device, comprising a voltage source configured to generate an input voltage, a positive output node electrically connected to the positive input node of the LCD panel, a negative output node electrically connected to the negative input node of the LCD panel, a positive-side switching converter electrically connected between the voltage source and the positive output node, a negative-side switching converter electrically connected between the voltage source and the negative output node, and a controller configured to, in an active-bias mode, alternate a polarity of a bias voltage across the positive output node and the negative output node by alternating between a forward-bias state and a reverse-bias state, such that the LCD panel transmits light inside and outside of a designated wavelength range from the scene to the image senor, and in a neutral-bias mode, provide a neutral bias voltage across the positive-side output node and the negative-side output node, such that the LCD panel blocks light from the scene in the designated wavelength range from reaching the image sensor. In this example and/or other examples, the controller may configured to, in the forward-bias state, control the positive-side switching converter to modulate the input voltage to provide a positive-side bias voltage at the positive output node and provide a zero-bias voltage at the negative output node, and in the reverse-bias state, control the negative-side switching converter to modulate the input voltage to provide a positive-side bias voltage at the negative output node and provide a zero-bias voltage at the positive output node. In this example and/or other examples, the power supply device may further comprise a positive-side switch electrically connected between the positive output node and a ground node, and a negative-side switch electrically connected between the negative output node and the ground node, the controller is configured to, in the neutral-bias mode, switch the positive-side switch to an ON state to electrically ground the positive output node, and switch the negative-side switch to an ON state to electrically ground the negative output node. In this example and/or other examples, the controller is configured to in the forward-bias state, switch the negative-side switch to the ON state to electrically ground the negative output node, and in the reverse-bias state, switch the positive-side switch to the ON state to electrically ground the positive output node. In this example and/or other examples, the positive-side switching converter may be electrically connected to a positive-side feedback node, the power supply device may further comprise a positive-side feedback resistor divider electrically connected between the positive output node and the positive-side feedback node, and the positive-side switching converter may be configured to modulate the input voltage to provide the positive-side bias voltage based at least on a feedback voltage measured via the positive-side resistor divider. In this example and/or other examples, the negative-side switching converter may be electrically connected to a negative-side feedback node, the power supply device may further comprise a negative-side feedback resistor divider electrically connected between the negative output node and the negative-side feedback node, and the negative-side switching converter may be configured to modulate the input voltage to provide the negative-side bias voltage based at least on a feedback voltage measured via the negative-side resistor divider. In this example and/or other examples, the power supply device may further comprise a positive-side resistor ladder electrically intermediate the positive-side switching converter and the positive output node, wherein the positive-side bias voltage is based at least on resistances of resistors of the positive-side resistor ladder, and a negative-side resistor ladder electrically intermediate the negative-side switching converter and the negative output node, wherein the negative-side bias voltage is based at least on resistances of resistors of the negative-side resistor ladder. In this example and/or other examples, the positive-side switching converter may include a boost switching converter and the negative-side switching converter may include a boost switching converter.

In yet another example, a head-mounted device, comprises a frame, an outward-facing camera mounted on the frame and configured to image a scene. The outward-facing camera comprises an image sensor a liquid crystal display (LCD) panel optically intermediate the image sensor and the scene, the LCD panel including a positive input node and a negative input node, and a power supply device, comprising a voltage source configured to generate an input voltage, a positive output node electrically connected to the positive input node of the LCD panel, a negative output node electrically connected to the negative input node of the LCD panel, a positive-side switching converter electrically connected between the voltage source and the positive output node, a negative-side switching converter electrically connected between the voltage source and the negative output node, and a controller configured to, in an active-bias mode, alternate a polarity of a bias voltage across the positive output node and the negative output node by alternating between a forward-bias state and a reverse-bias state, such that the LCD panel transmits light inside and outside of a designated wavelength range from the scene to the image senor, and in a neutral-bias mode, provide a neutral bias voltage across the positive output node and the negative output node, such that the LCD panel blocks light from the scene in the designated wavelength range from reaching the image sensor. In this example and/or other examples, the controller may be configured to, in the forward-bias state, control the positive-side switching converter to modulate the input voltage to provide a positive-side bias voltage at the positive output node and provide a zero-bias voltage at the negative output node, and in the reverse-bias state, control the negative-side switching converter to modulate the input voltage to provide a positive-side bias voltage at the negative output node and provide a zero-bias voltage at the positive output node. In this example and/or other examples, the power supply device may further comprise a positive-side switch electrically connected between the positive output node and a ground node, and a negative-side switch electrically connected between the negative output node and the ground node, and the controller may be configured to, in the neutral-bias mode, switch the positive-side switch to an ON state to electrically ground the positive output node, and switch the negative-side switch to an ON state to electrically ground the negative output node.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A power supply device, comprising:
a voltage source configured to generate an input voltage;
a positive output node;
a negative output node;
a positive-side switching converter electrically connected between the voltage source and the positive output node;
a negative-side switching converter electrically connected between the voltage source and the negative output node; and
a controller configured to:
in an active-bias mode, alternate a polarity of a bias voltage across the positive output node and the negative output node by alternating between a forward-bias state and a reverse-bias state,
in the forward-bias state, control the positive-side switching converter to modulate the input voltage to provide a positive-side bias voltage at the positive output node and provide a zero-bias voltage at the negative output node, and
in the reverse-bias state, control the negative-side switching converter to modulate the input voltage to provide a negative-side bias voltage at the negative output node and provide a zero-bias voltage at the positive output node, and
in a neutral-bias mode, provide a neutral bias voltage across the positive-side output node and the negative-side output node.

2. The power supply device of claim 1, wherein the positive output node is electrically connected to a positive input node of a liquid crystal display (LCD) panel and the negative output node is electrically connected to a negative input node of the LCD panel.

3. The power supply device of claim 2, wherein, in the active-bias mode, the LCD panel transmits light inside and outside of a designated wavelength range and in the neutral-bias mode the LCD panel blocks light in the designated wavelength range.

4. The power supply device of claim 1, further comprising:
a positive-side switch electrically connected between the positive output node and a ground node; and
a negative-side switch electrically connected between the negative output node and the ground node;
wherein the controller is configured to, in the neutral-bias mode, switch the positive-side switch to an ON state to electrically ground the positive output node, and switch the negative-side switch to an ON state to electrically ground the negative output node.

5. The power supply device of claim 4, wherein the controller is configured to, in the forward-bias state, switch the negative-side switch to the ON state to electrically ground the negative output node, and in the reverse-bias state, switch the positive-side switch to the ON state to electrically ground the positive output node.

6. The power supply device of claim 1, wherein the positive-side switching converter is electrically connected to a positive-side feedback node, wherein the power supply device further comprises a positive-side feedback resistor divider electrically connected between the positive output node and the positive-side feedback node, and wherein the positive-side switching converter is configured to modulate the input voltage to provide the positive-side bias voltage based at least on a feedback voltage measured via the positive-side resistor divider.

7. The power supply device of claim 1, wherein the negative-side switching converter is electrically connected to a negative-side feedback node, wherein the power supply device further comprises a negative-side feedback resistor divider electrically connected between the negative output node and the negative-side feedback node, and wherein the negative-side switching converter is configured to modulate the input voltage to provide the negative-side bias voltage based at least on a feedback voltage measured via the negative-side resistor divider.

8. The power supply device of claim 1, further comprising:
a positive-side resistor ladder electrically intermediate the positive-side switching converter and the positive output node, wherein the positive-side bias voltage is based at least on resistances of resistors of the positive-side resistor ladder; and
a negative-side resistor ladder electrically intermediate the negative-side switching converter and the negative output node, wherein the negative-side bias voltage is based at least on resistances of resistors of the negative-side resistor ladder.

9. The power supply device of claim 1, wherein the positive-side switching converter includes a boost switching converter and the negative-side switching converter includes a boost switching converter.

10. A camera, comprising:
an image sensor;
a liquid crystal display (LCD) panel optically intermediate the image sensor and a scene, the LCD panel including a positive input node and a negative input node, and
a power supply device, comprising:
a voltage source configured to generate an input voltage;
a positive output node electrically connected to the positive input node of the LCD panel;
a negative output node electrically connected to the negative input node of the LCD panel;
a positive-side switching converter electrically connected between the voltage source and the positive output node;
a negative-side switching converter electrically connected between the voltage source and the negative output node; and
a controller configured to:
in an active-bias mode, alternate a polarity of a bias voltage across the positive output node and the negative output node by alternating between a forward-bias state and a reverse-bias state, such that the LCD panel transmits light inside and outside of a designated wavelength range from the scene to the image senor; and
in a neutral-bias mode, provide a neutral bias voltage across the positive-side output node and the negative-side output node, such that the LCD panel blocks light from the scene in the designated wavelength range from reaching the image sensor.

11. The camera of claim 10, wherein the controller is configured to, in the forward-bias state, control the positive-side switching converter to modulate the input voltage to provide a positive-side bias voltage at the positive output node and provide a zero-bias voltage at the negative output node, and in the reverse-bias state, control the negative-side switching converter to modulate the input voltage to provide a negative-side bias voltage at the negative output node and provide a zero-bias voltage at the positive output node.

12. The camera of claim 10, wherein the power supply device further comprises:
a positive-side switch electrically connected between the positive output node and a ground node; and
a negative-side switch electrically connected between the negative output node and the ground node;
wherein the controller is configured to, in the neutral-bias mode, switch the positive-side switch to an ON state to electrically ground the positive output node, and switch the negative-side switch to an ON state to electrically ground the negative output node.

13. The camera of claim 12, wherein the controller is configured to:
in the forward-bias state, switch the negative-side switch to the ON state to electrically ground the negative output node, and
in the reverse-bias state, switch the positive-side switch to the ON state to electrically ground the positive output node.

14. The camera of claim 10, wherein the positive-side switching converter is electrically connected to a positive-side feedback node, wherein the power supply device further comprises a positive-side feedback resistor divider electrically connected between the positive output node and the positive-side feedback node, and wherein the positive-side switching converter is configured to modulate the input voltage to provide the positive-side bias voltage based at least on a feedback voltage measured via the positive-side resistor divider.

15. The camera of claim 10, wherein the negative-side switching converter is electrically connected to a negative-side feedback node, wherein the power supply device further comprises a negative-side feedback resistor divider electrically connected between the negative output node and the negative-side feedback node, and wherein the negative-side switching converter is configured to modulate the input voltage to provide the negative-side bias voltage based at least on a feedback voltage measured via the negative-side resistor divider.

16. The camera of claim 10, wherein the power supply device further comprises:
a positive-side resistor ladder electrically intermediate the positive-side switching converter and the positive output node, wherein the positive-side bias voltage is based at least on resistances of resistors of the positive-side resistor ladder; and
a negative-side resistor ladder electrically intermediate the negative-side switching converter and the negative output node, wherein the negative-side bias voltage is based at least on resistances of resistors of the negative-side resistor ladder.

17. The camera of claim 10, wherein the positive-side switching converter includes a boost switching converter and the negative-side switching converter includes a boost switching converter.

18. A head-mounted device, comprising:
a frame;
an outward-facing camera mounted on the frame and configured to image a scene, the outward-facing camera comprising:
an image sensor;

a liquid crystal display (LCD) panel optically intermediate the image sensor and the scene, the LCD panel including a positive input node and a negative input node, and a power supply device, comprising:
- a voltage source configured to generate an input voltage;
- a positive output node electrically connected to the positive input node of the LCD panel;
- a negative output node electrically connected to the negative input node of the LCD panel;
- a positive-side switching converter electrically connected between the voltage source and the positive output node;
- a negative-side switching converter electrically connected between the voltage source and the negative output node; and
- a controller configured to:
  - in an active-bias mode, alternate a polarity of a bias voltage across the positive output node and the negative output node by alternating between a forward-bias state and a reverse-bias state, such that the LCD panel transmits light inside and outside of a designated wavelength range from the scene to the image senor; and
  - in a neutral-bias mode, provide a neutral bias voltage across the positive output node and the negative output node, such that the LCD panel blocks light from the scene in the designated wavelength range from reaching the image sensor.

19. The head-mounted device of claim 18, wherein the controller is configured to, in the forward-bias state, control the positive-side switching converter to modulate the input voltage to provide a positive-side bias voltage at the positive output node and provide a zero-bias voltage at the negative output node, and in the reverse-bias state, control the negative-side switching converter to modulate the input voltage to provide a negative-side bias voltage at the negative output node and provide a zero-bias voltage at the positive output node.

20. The head-mounted device of claim 18, wherein the power supply device further comprises:
- a positive-side switch electrically connected between the positive output node and a ground node; and
- a negative-side switch electrically connected between the negative output node and the ground node;
- wherein the controller is configured to, in the neutral-bias mode, switch the positive-side switch to an ON state to electrically ground the positive output node, and switch the negative-side switch to an ON state to electrically ground the negative output node.

* * * * *